(12) United States Patent
Favero et al.

(10) Patent No.: US 8,871,692 B2
(45) Date of Patent: Oct. 28, 2014

(54) WATER-SOLUBLE POLYMERS FOR OIL RECOVERY

(75) Inventors: Cédrick Favero, Saint-Romain-le-Puy (FR); Nicolas Gaillard, Saint-Etienne (FR); Dennis Marroni, Sorbiers (FR)

(73) Assignee: S.P.C.M. S.A., Andrézieux Bouthéon (FR)

( * ) Notice: Subject to any disclaimer, the term of this patent is extended or adjusted under 35 U.S.C. 154(b) by 0 days.

(21) Appl. No.: 13/518,412

(22) PCT Filed: Jan. 26, 2011

(86) PCT No.: PCT/EP2011/051091
§ 371 (c)(1),
(2), (4) Date: Aug. 6, 2012

(87) PCT Pub. No.: WO2011/092221
PCT Pub. Date: Aug. 4, 2011

(65) Prior Publication Data
US 2013/0072405 A1 Mar. 21, 2013

Related U.S. Application Data

(60) Provisional application No. 61/337,275, filed on Feb. 2, 2010.

(30) Foreign Application Priority Data

Jan. 26, 2010 (EP) ..................... 10151720

(51) Int. Cl.
*C09K 8/68* (2006.01)
*C09K 8/588* (2006.01)
*C09K 8/12* (2006.01)

(52) U.S. Cl.
CPC ............. *C09K 8/588* (2013.01); *C09K 2208/28* (2013.01); *C09K 8/68* (2013.01); *C09K 8/12* (2013.01)
USPC .......................................... 507/225; 507/222

(58) Field of Classification Search
CPC .. C09K 2208/30; C09K 8/74; C09K 2208/32; C09K 8/602; C09K 8/68; C09K 2208/08; C09K 5/063; C09K 5/10; C09K 17/32; C09K 17/48; C09K 2208/28; C09K 8/12; C09K 8/588; C09K 8/62; C09K 8/665; C09K 8/805; C09K 2208/00; C09K 2208/22; C09K 2208/34; C09K 5/048; C09K 8/032; C09K 8/035; C09K 8/42; C09K 8/514; C09K 8/52; C09K 8/54; C09K 8/584; C09K 8/594; E21B 33/13; E21B 43/26; E21B 44/00; E21B 15/003; E21B 33/064; E21B 34/08; E21B 47/00; E21B 10/5735; E21B 15/02; E21B 17/00; E21B 17/02; E21B 21/00; E21B 23/04; E21B 33/03; E21B 33/076
See application file for complete search history.

(56) References Cited

U.S. PATENT DOCUMENTS

| | | | | | |
|---|---|---|---|---|---|
| 3,476,186 | A | * | 11/1969 | Sarem | 166/400 |
| 3,557,562 | A | * | 1/1971 | McLaughlin | 405/264 |
| 4,338,203 | A | * | 7/1982 | Hunter | 507/224 |
| 4,341,647 | A | * | 7/1982 | Hunter | 507/224 |
| 4,486,340 | A | * | 12/1984 | Glass, Jr. | 507/216 |
| 4,563,290 | A | * | 1/1986 | Okada et al. | 507/226 |
| 2006/0116296 | A1 | * | 6/2006 | Kippie et al. | 507/244 |

FOREIGN PATENT DOCUMENTS

CA 2457698 * 6/2005

OTHER PUBLICATIONS

International Search Report dated Feb. 15, 2011 for PCT Application No. PCT/EP2011/051091.
Written Opinion of the International Searching Authority for PCT Application No. PCT/EP2011/051091.

* cited by examiner

*Primary Examiner* — Susannah Chung
*Assistant Examiner* — Kumar R Bhushan
(74) *Attorney, Agent, or Firm* — Amster, Rothstein & Ebenstein LLP

(57) ABSTRACT

The present invention refers to the use of anionic water-soluble polymers being partially or totally neutralized with an organic counter-ion for oil filed application, especially tertiary oil recovery steps.

14 Claims, No Drawings

WATER-SOLUBLE POLYMERS FOR OIL RECOVERY

This is a U.S. national phase of PCT Application No. PCT/EP2011/051091, filed Jan. 26, 2011, which claims the benefit of European Application No. 10151720.9, filed Jan. 26, 2010 and U.S. Provisional Application No. 61/337,275, filed Feb. 2, 2010.

The present invention relates to the use of polymers for oil field applications such as enhanced oil recovery. Furthermore, the present invention refers to a method for treating a subterranean formation and especially to a process and system for recovering oil from oil-bearing subterranean formations or reservoirs, wherein a polymer is employed in the tertiary recovery of oil.

Crude oil recovery and production in oil reservoirs may include three distinct phases, namely primary, secondary, and tertiary recovery. During primary recovery, the natural pressure of the reservoir or gravity drive the oil out, combined with e.g. pumps which bring the oil to the surface. However, only about 10 percent of a reservoir's original oil in place is typically produced during primary recovery. Secondary recovery techniques are usually based on the injection of water or gas to displace oil and drive it out to the production side, resulting in the recovery of 20 to 40 percent of the original oil in place. Additionally, several tertiary or enhanced oil recovery techniques have been developed that offer prospects for recovering 30 to 60 percent, or more, of the reservoir's original oil in place.

U.S. Pat. No. 6,552,141 and U.S. Pat. No. 6,660,819 describe the production of synthetic polymer having an extremely low residual monomer content. A nitrogen or ammonium salt compound is added to the polymerization vessel and the product is "cooked" at a temperature of from 120° C. to 240° C. The resulting polymer contains less than 50 ppm of free monomer. In this patent, the acidic monomer that can be used in polymerization is not neutralized with pure nitrogen compounds.

Patent No. WO 2007/075603 describes antiscaling agents that have improved biodegradability properties. These polymers contain 100% of anionic monomer neutralized with organic amines and molecular weights are below 1 million, and preferably comprised between 1000 and 50000 g/mol.

U.S. Pat. No. 7,287,593 describes a method of fracturing formations using crosslinked carboxy modified polymer and a viscosifying quaternary amine salt. The polymer thus formed is injected diluted along with a crosslinking agent made of a polyvalent metal ion, such as chromium, iron, aluminium, titanium and zirconium. This kind of polymers give a three dimensional network made of unfiltrable microgels.

In the art the generic term "Enhanced Oil Recovery" (EOR) is used to describe "improved oil recovery" or "tertiary recovery". Enhanced oil recovery or tertiary oil recovery encompasses gas injection techniques, chemical injection techniques, ultrasonic stimulation, microbial injection techniques, or thermal recovery (which includes cyclic steam and steamflooding). Chemical injection techniques encompass several possible methods including the injection of aqueous solutions containing polymers (flooding), which can either reduce the crude's viscosity or increase the viscosity of water being injected to force the crude out of the stratum. The recovery of residual oil from oil-bearing subterranean formations by flooding of the formation with an aqueous medium containing a polymer such as a partially hydrolyzed polyacrylamide has received widespread attention. However, very often the injectivity and mobility properties of these polymers or the corresponding solutions are poor and may cause an undesired plugging. The plugging of e.g. the pores and throats of a rock or subterranean formation can lead to an undesired significant increase of the injection pressure and to a blocking of sweep targeted areas. These oil containing areas are no longer accessible for EOR techniques. Thus, poor injectivity which e.g. may result in a plugging of subterranean formations finally prevents recovery of oil by e.g. tertiary or enhanced oil recovery techniques.

Thus, it is an object of the present invention to provide polymers which allow for the preparation of solutions or treating fluids showing improved injectivity in, for example, tertiary or enhanced oil recovery techniques. Furthermore, it would be desirable to provide biodegradable polymers for oil field application such as enhanced oil recovery.

In the meaning of the present invention, the generic term "organic" refers to compounds comprising carbon excluding hydrogen free chalcogenides (e.g. CO, $CO_2$, $CS_2$) as well as its derivatives (e.g. $H_2CO_3$), the saline and metallic carbides and metal carbonyls.

The inventors of the present invention surprisingly found that the foregoing and other objects can be solved by the use of specific water-soluble polymers as described herein. Accordingly, the present invention according to a first aspect relates to the use of a water-soluble polymer for oil field applications, wherein the water-soluble polymer is anionic, is partially or totally neutralized with at least one organic counter-ion and is obtainable from a polymerization mixture containing at least one non-ionic monomer and at least one anionic monomer.

"Anionic polymers" in the meaning of the present invention are polymers that contain anionic or negatively charged groups attached to the polymer. Examples of anionic groups include without limitation carboxylate, sulfonate and phosphonate. The anionic groups according to the present invention are associated with organic positively charged counterions. In aqueous solutions, the association between the anionic group and the counter-ion is typically a function of pH, in a manner understood by those skilled in the art. The polymers can be linear or branched. The inventive polymer is a "copolymer" comprising two or more different recurring units formed by, e.g., copolymerizing two or more different monomers. The copolymers can also be obtained by modification of monomeric units of a homopolymer by co- or post-reaction, such as hydrolysis, Hofmann degradation and/or Mannich reaction.

The term "water-soluble polymers" in the meaning of the present invention refers to polymers that can be dissolved in water.

The term "anionicity" in the meaning of the present invention refers to the relative amount of anionic monomeric units comprised in polymers of the present invention.

The inventors found that the use of the afore-mentioned polymers leads to improved injectivity compared to other polymers. The polymers used according to the present invention avoid or reduce microgel formation and, thus, reduce the plugging problems observed for prior art polymers used for chemical injection techniques. Furthermore, by using the polymers contemplated by the present invention environmental problems are reduced since the polymers exhibit improved biodegradability properties. It is especially preferred to use the water-soluble anionic polymer or polymeric composition contemplated according to the present invention for enhanced oil recovery. The polymers of the invention may also advantageously be used in drilling, hydraulic fracturing, drag reduction applications, in the mining process, in water shut-off and conformance control.

According to a second aspect of the present invention, a method for treating a subterranean formation is provided, wherein the method comprises at least the following steps:
  a) providing a water-soluble polymer, wherein the water-soluble polymer is anionic, is partially or totally neutralized with at least one organic counter-ion and is obtainable from a polymerization mixture containing at least one non-ionic monomer and at least one anionic monomer.
  b) preparing an aqueous solution or treating fluid from the water-soluble anionic polymer
  c) employing the aqueous solution or treating fluid obtained in step b) in the tertiary recovery of oil from said formation.

It is to be understood that the water-soluble anionic polymer to be used for the inventive method corresponds to the water-soluble anionic polymer provided for the first aspect of the present invention, i.e. the use of said polymer for oil field applications. Thus, the preferred embodiments described in the following are meant to refer to both of the foregoing aspects.

According to one preferred embodiment of the present invention, the at least one organic counter-ion is selected from organic amines in the protonated form with the general formula $^+NHR_1, R_2, R_3$, wherein $R_1, R_2, R_3$ independently from each other are selected from the group consisting of H, substituted or unsubstituted C1-C10alkyl, substituted or unsubstituted C3-C8cycloalkyl, substituted or unsubstituted C6-C14aryl, substituted or unsubstituted heteroaryl and polyoxyalkylene-moieties, like polyoxyethylene-moieties.

Compounds with several organic counter-ion of interest are also included such as cations derived from dimethylaminopropylamine and ethylenediamine. Alternatively, corresponding phosphonium or sulfonium compounds may be used as counter-ions.

The term "alkyl" refers to a hydrocarbon chain that may be a straight chain or branched chain, containing the indicated number of carbon atoms. For example, C1-C10 indicates that the group may have from 1 to 10 (inclusive) carbon atoms in it. For example, the term "C1-C3 alkyl" refers to a straight or branched chain saturated hydrocarbon containing 1-3 carbon atoms. Examples of a C1-C3 alkyl group include, but are not limited to, methyl, ethyl, propyl and isopropyl.

The term "cycloalkyl" refers to a saturated cycloalkyl group. The term "C3-C8 cycloalkyl", for example, refers to a non-aromatic mono- or multicyclic hydrocarbon ring system having a single radical and 3-8 carbon atoms. Exemplary monocyclic cycloalkyl rings include cyclopropyl, cyclopentyl, and cyclohexyl.

The term "aryl" refers to an aromatic hydrocarbon group. If not otherwise specified, in this specification the term aryl refers to a C6-C14 aryl group. Examples of an C6-C14aryl group include, but are not limited to, phenyl, 1-naphthyl, 2-naphthyl, 3-biphen-1-yl, anthryl, tetrahydronaphthyl, fluorenyl, indanyl, biphenylenyl, and acenaphthenyl, groups.

The term "heteroaryl" refers to mono, bicyclic, and tricyclic aromatic groups of 5 to 13 atoms containing at least one heteroatom and at least one aromatic ring, if not specified otherwise. A heteroatom as used in the term heteroaryl refers to oxygen, sulfur and nitrogen. Examples of monocyclic heteroaryls include, but are not limited to pyrrolyl, oxazinyl, thiazinyl, pyridinyl, diazinyl, triazinyl, tetrazinyl, imidazolyl, tetrazolyl, isoxazolyl, furanyl, furazanyl, oxazolyl, thiazolyl, thiophenyl, pyrazolyl, triazolyl, and pyrimidinyl. Examples of bicyclic heteroaryls include but are not limited to, benzimidazolyl, indolyl, indolinyl, isoquinolinyl, quinolinyl, quinazolinyl, benzothiophenyl, benzodioxolyl, benzo[1,2,5] oxadiazolyl, purinyl, benzisoxazolyl, benzoxazolyl, benzothiazolyl, benzodiazolyl, benzotriazolyl, isoindolyl and indazolyl. Examples of tricyclic heteroaryls include but are not limited to, dibenzofuran, dibenzothiophenyl, phenanthridinyl, and benzoquinolinyl.

The term "substituted" as used herein refers to substituted moieties (including substituted C1-C10alkyl, substituted C3-C8cycloalkyl, substituted C6-C14aryl and substituted heteroaryl) bearing one or more of the following groups or substituents: halogen, —C1-C6alkyl, —C1-C6alkenyl, -hydroxyl, —NH$_2$, —NH(C1-C6alkyl), —N(C1-C6alkyl)(C1-C6alkyl), —N(C1-C3alkyl)C(O)(C1-C6alkyl), —NHC(O)(C1-C6alkyl), —NHC(O)H, —C(O)NH2, —C(O)NH(C1-C6alkyl), —C(O)N(C1-C6alkyl)(C1-C6alkyl), —CN, CHN (C1-C6alkyl), —O(C1-C6alkyl), —C(O)OH, —C(O)O(C1-C6alkyl), —(C1-C6alkyl)C(O)O(C1-C6alkyl), —C(O)(C1-C6alkyl), —C6-C14aryl, —C5-C9heteroaryl, —C3-C8cycloalkyl, -haloalkyl, -aminoalkyl, —OC(O)(C1-C6alkyl), —C1-C6carboxyamidoalkyl and/or —NO$_2$.

The term "halogen" includes fluoride, bromide, chloride or iodide.

The term "halo" means —F, —Cl, —Br or —I. An exemplary haloalkyl includes trifluoromethyl.

Especially preferred counter-ions to be used for partially or totally neutralizing the anionic polymers according to the present invention include $^+NH_3(CH_3)$, $^+NH_2(CH_3)_2$, $^+NH(CH_3)_3$, $^+NH_3(CH_2CH_3)$, $^+NH_2(CH_2CH_3)_2$, $^+NH(CH_2CH_3)_3$, $^+NH_3(CH_2CH_2OH)$, $^+NH_2(CH_2CH_2OH)_2$, $^+NH(CH_2CH_2OH)_3$, methylbis(polyoxyethylene (15)) octadecyl quaternary ammonium, cations derived from N,N-Diethanolamine, N,N,N-triethanolamine, N-ethanolamine, N,N-di-isopropylamine, N,N-diethylamine, N,N-dipropylamine, N,N-dimethylaminopropylamine (DMAPA), N-propylamine, N-isopropylamine, N-isobutylamine, N,N-di-isobutylamine, N,N-dibutylamine and N-butylamine.

The term "partially neutralized" in the meaning of the present invention refers to polymers where more than 1% and less than 100% of the anionic groups present in the polymer are neutralized with one or several of the aforementioned organic counter-ions. If 100% of the anionic groups present in the polymer are neutralized with one or several of the aforementioned organic counter-ions, such polymer would be "totally neutralized" in the meaning of the present invention. It may be preferred that between 5 to 80% or 10 to 70% of the anionic groups present in the polymer are neutralized with one or several organic counter-ion. The remaining neutralization of the anionic groups if desired can be achieved using sodium hydroxide or ammonia. It may be preferred that between 10 to 90% or 10 to 70% of the anionic groups present in the polymer are neutralized with an organic counter-ion.

It may be preferred according to the present invention that the at least one non-ionic monomer is a water-soluble vinyl-monomer, preferably selected from the group consisting of acrylamide and methacrylamide, N-isopropyacrylamide, N,N-dimethylacrylamide, diacetone acrylamide, N-vinylformamide, N-vinyl acetamide, N-vinylpyridine, N-vinyl caprolactone and N-vinylpyrrolidone.

The at least one anionic monomer according to the present invention may be selected from the group consisting of acrylic acid, methacrylic acid, itaconic acid, crotonic acid, maleic acid, fumaric acid, vinylsulfonic acid, vinylphosphonic acid, (meth)allylsulfonic acid, (meth)allylphosphonic acid, acrylamido methyl butanoic acid, acrylamido tertiary butyl sulfonic acid and water-soluble salts of the foregoing substances. Also included are monomers derived from amino acid such as undecanoil acrylamide acid as well as sulfonated alkylated acrylamide monomers obtained by Ritter reaction.

It is to be understood that the foregoing preferred non-ionic monomers can be combined with the foregoing preferred anionic monomers.

Especially preferred combinations of non-ionic monomers and anionic monomers according to the present invention include combinations of acrylamide (AM) and N-vinylpyrrolidone (NVP) as non-ionic monomers and acrylic acid (AA) and acrylamide tertiary butyl sulfonic acid (ATBS) as anionic monomers. Polymers made from a combination of acrylamide/acrylic acid, acrylamide/acrylamide tertiary butyl sulfonic acid, acrylamide/acrylic acid/acrylamide tertiary butyl sulfonic acid, acrylamide/N-vinylpyrrolidone/acrylamide tertiary butyl sulfonic acid, acrylamide/acrylic acid/N,N-dimethylacrylamide and optionally other monomers are especially preferred.

For the inventive use and method also a polymerization mixture may be used which contains at least one "cationic monomer". Preferably, such polymerization mixture contains at least one cationic monomer which is derived from a non ionic monomer being protonated, more preferably a cationic monomer being derived from a non ionic monomer having a tertiary amine function including dimethylaminoethyl acrylate (DMAEA), dimethylaminoethyl methacrylate (DMAEMA), dimethylaminopropyl acrylate (DMAPA) and dimethylaminopropyl methacrylate (DMAPMA). Those monomers may be advantageously used as a neutralizing agent for the acidic monomers when the amine group of the at least one non ionic monomer is protonated or becomes cationic when being protonated.

Additionally or alternatively, the polymerization mixture may contain at least one branching agent, preferably at least one branching agent selected from the group consisting of methylene bisacrylamide (MBA), ethylene glycol diacrylate, polyethylene glycol dimethacrylate, vinyloxyethylacrylate or methacrylate, triallylamine, pentaerythritol triallyl ether, glycidylethers including diglycidylether, and epoxides. The level of branching agent is adjusted to keep the resulting polymer water-soluble. Preferably, the crossinking has only an effect on the microstructure of the polymer but does not create interpolymer bridging.

The anionic water-soluble polymer according to the present invention may be hydrophobically modified. The term "hydrophobically modified" in the meaning of the present invention describes a hydrophobic modification and refers to the incorporation of hydrophobic groups into the polymer. This can be achieved by chemically modifying the e.g. hydrophilic polymer or by incorporating monomers bearing a hydrophobic moiety into the polymerization mixture.

It is especially preferred according to the present invention that the water-soluble anionic polymer in aqueous solution provides a filter ratio of not more than 1.5, preferably of not more than 1.3, and more preferably of not more than 1.1. The "filter ratio" (FR) according to the present invention is determined by a test as described herein which involves injecting an aqueous polymer solution through a filter at a constant pressure. The FR is determined by the measured difference between time at 300 mL minus time at 200 mL, divided by difference between time at 200 mL minus time at 100 mL according to the following formula:

$$FR = \frac{t_{300\,ml} - t_{200\,ml}}{t_{200\,ml} - t_{100\,ml}},$$

wherein $t_{300\,ml}$=time needed for obtaining 300 ml filtrate at constant pressure $t_{200\,ml}$=time needed for obtaining 200 ml filtrate at constant pressure $t_{100\,ml}$=time needed for obtaining 100 ml filtrate at constant pressure According to another preferred embodiment of the present invention, the anionicity of the water-soluble anionic polymer is less than 70 mol-%.

According to yet another preferred embodiment of the present invention, the weight average molecular weight of the water-soluble anionic polymer is more than 1 million and less than 20 million.

The water-soluble anionic polymer according to the present invention may be provided in the form of a powder, an inverse emulsion, an emulsion, a water in water dispersion, a microbead, a polymer solution and dried forms thereof.

According to the present invention, the water-soluble anionic polymer preferably is contained in the solution or treating fluid in an amount of between 10 ppm to 7.500 ppm of the total weight of the treating fluid. The term "treating fluid" in the meaning of the present invention refers to the solution or suspension used for the oil filed applications. Said fluid beside the water-soluble anionic polymers may contain other additives or components.

According to an especially preferred embodiment of the present invention a water-soluble polymer, with a molecular weight between 1 to 20 million, is preferably in form of a powder or an inverse emulsion, wherein the water-soluble polymer is obtainable from a polymerization mixture containing acrylamide, acrylic acid, acrylamide tertiary butyl sulfonic acid and/or N-vinylpyrrolidone and wherein acidic anionic groups of the water-soluble polymer are partially neutralized with diethanol amine.

In the following, the foregoing aspects and embodiments are described in more detail:

The present invention refers to the use of specific polymers being partially or totally neutralized with an organic counter-ion which provide improved injection properties in oil field applications and especially in tertiary recovery techniques for oil recovery. The polymers or aqueous solutions containing said polymers provide improved filterability properties which are reflected by a low filter ratio (FR). The filterability properties or the FR describe the ability of the polymer-containing solution to pass through a filter, thereby simulating injectivity of such solution in a rock formation.

Furthermore, by partially or totally neutralizing the anionic water-soluble polymer with organic counter-ions like e.g. the aforementioned ammonium-based counter-ions, the biodegradability of the polymers or the solution containing the polymer is significantly improved.

Thus, the present invention allows for improved oil recovery and especially for the application of tertiary recovery techniques. The water-soluble polymers suggested by the present invention are contemplated to be used in a treating fluid, wherein the treating fluid provides improved injectivity and also increased biodegradability with respect to the polymer content. It is indicated that the inventive treatment fluid containing the water-soluble anionic polymers of the present invention can be used for the chemical injection techniques known to the skilled person. It is well known in the art how to apply polymeric solutions in e.g. tertiary recovery techniques for conveying oil.

One of the most frequently used methods is based on the injection of water into the reservoir through dedicated injection wells. This is commonly referred to as secondary recovery. When the water content in the produced fluid becomes too high, the secondary recovery will be stopped. By using tertiary or further enhanced oil recovery (EOR) techniques, additional oil can be conveyed from the oil field. Such techniques include thermal techniques, non-thermal techniques such as electrical, miscible, steam or even chemical techniques for enhanced recovery of the oil remaining in place. In the context of the present invention, the term "oil" encompasses any type of oil including light oil, heavy oil, or even bituminous oil. The polymers of the present invention most preferably may be used for tertiary oil recovery techniques (chemical enhanced oil recovery), involving the injection of the water-soluble polymers in the form of a dilute solution or treatment fluid. Generally, the efficiency of the chemical treatment by the addition of water-soluble polymers is improved over simply water injection. By "thickening" the injected water improved sweep efficiency and control of the mobility in the field can be achieved, in order to recover the oil more rapidly and efficiently.

The treatment fluid to be injected in the subterranean formation according to the present invention contains the inventive water-soluble polymer and, optionally may contain other chemical compounds useful for enhanced oil recovery. Suitable treatment fluids include water (e.g., freshwater, saltwater, brine, seawater) and, optionally non-aqueous fluids (e.g., oxygenated solvents, hydrocarbon solvents, etc.). The water-soluble polymer may be present at any suitable concentration. Preferably, the water-soluble polymer may be present in an amount of from about 10 ppm to 7500 ppm of total weight of treating fluid. The treating fluids incorporating the inventive polymer may have any suitable viscosity. The incorporation or the use of the polymers may lead to an increase of the viscosity of at least 10%, preferably 25% and even more preferably 50% compared to the viscosity of the treating fluid without the polymer, under the same conditions.

The treatment fluids of the invention employing anionic water-soluble polymers may further contain other additives and chemicals that are known to be commonly used in oilfield applications by those skilled in the art. These include, but are not necessarily limited to, materials such as surfactants, high temperature fluid stabilizers (e.g. sodium thiosulfate, mercaptobenzothiazol, tiourea), oxygen scavengers (e.g. sulfites), alcohols (e.g. isopropanol), scale inhibitors, corrosion inhibitors, fluid-loss additives, bactericides and the like.

Surfactants or surface active agents may be added to the fluid. Surfactants, solvents and co-solvents may be included e.g. to optimize the oil recovery by changing the interfacial tension and in turn increasing the quantity of oil that can be pushed out by the polymer solution. In the case of harsh conditions in the reservoir due to the presence of either contaminants or high temperatures, additional stabilizers may be added to prevent oxidation or free radical reaction. These other chemical compounds or additives which may be contained in the treatment fluid may include weak, strong or extra-strong, inorganic or organic bases capable of saponifying the crude oils and fabricating surfactant species in-situ for emulsifying the oil. By way of example, these include sodium carbonate, caustic soda, borate and metaborate compounds, amines and basic polymeric species.

The inventive anionic water-soluble polymer may be prepared from a corresponding polymerization mixture by the polymerization techniques known to the skilled person. These techniques include solution polymerization, suspension polymerization, gel polymerization, precipitation polymerization, emulsion polymerization (aqueous or reverse), optionally followed by a drying step, suspension polymerization and micellar polymerization, optionally followed by a precipitation step. The water-soluble polymers can be obtained as an emulsion (standard or inverse), a powder or any others liquid or solid forms. Due to the selection of monomers, the polymer may have a linear, branched, structure or a comb architecture (comb polymer) or a star structure (star polymer). It may be especially preferred according to the present invention to obtain or provide the water-soluble polymer as a powder or an inverse emulsion.

The residual monomer content in the polymers of the present invention preferably is below 1000 ppm and may preferably be more than 100 ppm. Preferably, no specific post treatment is needed to reduce the free monomer content. A corresponding monomer content does not affect the injectivity properties of the treatment fluid. It may be advantageous to have a content of free acrylamide monomer of less than 1000 ppm for safety and labeling reasons. On the other hand, the presence of free acrylamide monomer in an amount of more than 100 ppm enhances the stability of the polymer molecular weight during the propagation in the reservoir. Thus, it may be preferred to provide a content of free acrylamide monomer in the polymer of more than 100 ppm.

The polymer preferably has an anionicity lower than 70 mol %, more preferably lower than 50 mol-% and/or of at least 10 mol-%. The weight average molecular weight of between 1 million and 20 million.

According to one especially preferred embodiment of the present invention, the polymerization mixture used for making the water-soluble anionic polymer contains acrylamide and N-Vinylpyrrolidone as the non-ionic monomer. Anionic polyacrylamides may be derived from copolymerization of acrylamide and acrylic acid as the anionic monomer or co-hydrolysis or post-hydrolysis of a polyacrylamide or by copolymerization or terpolymerization of acrylamide with other ionic or non-ionic functional monomers. It is especially preferred that the acrylamide based polymers are obtained by copolymerization with acrylic acid and acrylamido tertiary butyl sulfonic acid. Other preferred monomers are N-vinylpyrrolidone and N-dimethylacrylamide.

Other suitable non-ionic monomer according to the present invention include water-soluble vinylmonomer, preferably selected from the group consisting of acrylamide and methacrylamide, N-isopropyacrylamide, N,N-dimethylacrylamide, diacetone acrylamide, N-vinylformamide, N-vinyl acetamide, N-vinylpyridine, N-vinyl caprolactone and N-vinylpyrrolidone.

Other suitable anionic monomer according to the present invention include acrylic acid, methacrylic acid, itaconic acid, crotonic acid, maleic acid, fumaric acid, vinylsulfonic acid, vinylphosphonic acid, (meth)allylsulfonic acid, (meth)allylphosphonic acid, acrylamido methyl butanoic acid, acrylamido tertiary butyl sulfonic acid and water-soluble salts of the foregoing substances. Also included are monomers derived from amino acid such as undecanoil acrylamide acid as well as sulfonated alkylated acrylamide monomers obtained by Ritter reaction. It is to be understood that the foregoing preferred non-ionic monomers can be combined with the foregoing preferred anionic monomers.

Optionally, the polymerization mixture may additionally contain at least one "cationic monomer". The "cationic monomer" may be derived from at least one non ionic monomer that becomes cationic when being protonated. Said at least one cationic monomer is selected from the group consisting of protonated monomers having a tertiary amine function such as dimethylaminoethyl acrylate (DMAEA), dimethylaminoethyl methacrylate (DMAEMA), dimethylaminopropyl acrylate (DMAPA), dimethylaminopropyl methacrylate (DMAPMA). Those monomers may be advantageously used as neutralizing agent for the acidic monomers when the amine group of the at least one non ionic monomer is protonated or becomes cationic when being protonated.

In certain applications, the inventive water-soluble anionic polymers contains a nominal amount, if any, of hydrophobic groups, such as alkyl groups, incorporated in the polymer. Alternatively, the inventive anionic water-soluble polymers may be hydrophobically modified polymers to provide the desired associativity. As used in this disclosure, the term "hydrophobically modified" describes the incorporation into the polymer structure of hydrophobic groups. While the hydrophobically modified polymers have hydrophobic groups incorporated into the e.g. hydrophilic polymer structure, they should remain water-soluble.

The hydrophobically modified polymers may be synthesized utilizing any suitable technique known to the skilled person. Those of ordinary skill in the art, with the benefit of this disclosure, will be able to determine suitable methods for the synthesis of suitable hydrophobically modified polymers.

The anionic water-soluble polymers contemplated for the inventive use or the inventive method are partially or totally neutralized with an organic counter-ion. The organic counter-ion is selected from organic amines in the protonated form with the general formula $^+NHR_1, R_2, R_3$, wherein $R_1, R_2, R_3$ independently from each other are selected from the group consisting of H, substituted or unsubstituted C1-C10alkyl, substituted or unsubstituted C3-C8cycloalkyl, substituted or unsubstituted C6-C14aryl, substituted or unsubstituted heteroaryl and polyoxyalkylene-moieties, like polyoxyethylene-moieties.

Especially preferred organic counterions are derived from dimethylaminopropylamine and ethylenediamine. In the schemes shown below, exemplary a corresponding neutralization step is shown.

Scheme 1: Neutralization of ATBS/NVP copolymer with dimethylaminopropylamine (DMAPA)

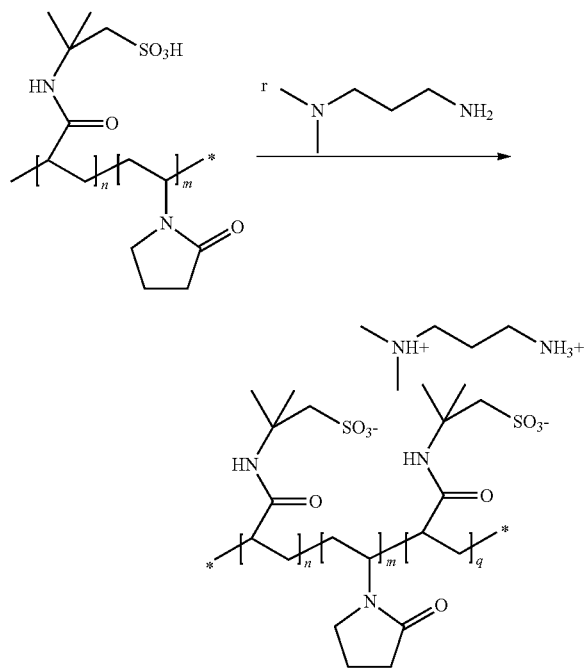

With r ≤ n/2

Scheme 2: Neutralization of Acrylamide/Acrylic acid polymer with an organic amine

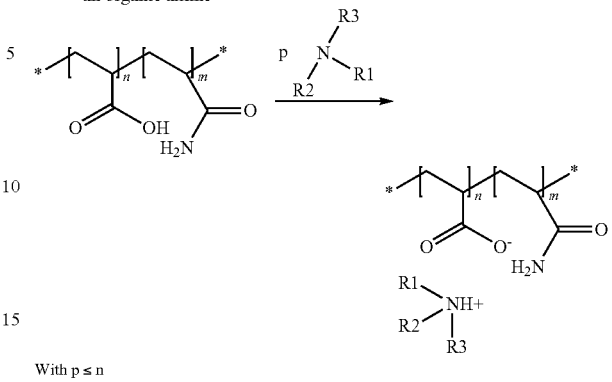

With p ≤ n

As can be gathered from these schemes, some compounds, like dimethylaminopropylamine may provide more than one cationic or counter-ion function. Also, corresponding phosphonium or sulfonium compounds may be used as counter-ions.

Examples of such organic counter-ions are $^+NH_3(CH_3)$, $^+NH_2(CH_3)_2$, $^+NH(CH_3)_3$, $^+NH_3(CH_2CH_3)$, $^+NH_2(CH_2CH_3)_2$, $^+NH(CH_2CH_3)_3$, $^+NH_3(CH_2CH_2OH)$, $^+NH_2(CH_2CH_2OH)_2$, $^+NH(CH_2CH_2OH)_3$, methylbis(polyoxyethylene (15)) octadecyl quaternary ammonium, N,N-Diethanolamine, N,N,N-triethanolamine, N-ethanolamine, N,N-di-isopropylamine, N,N-diethylamine, N,N-dipropylamine, N,N-dimethylaminopropylamine (DMAPA), N-propylamine, N-isopropylamine, N-isobutylamine, N,N-di-isobutylamine, N,N-dibutylamine and N-butylamine.

The quaternary amine salts used in the present invention as organic counter-ion also include those described in U.S. Pat. No. 7,287,593. Examples of such quaternary amine salts include, but are not limited to, di-(hydrogenated tallowalkyl) dimethyl ammonium chloride, cocoalkyltrimethyl ammonium chloride, benzyldimethylcocoalkyl ammonium chloride, benzylbis(2-hydroxyethyl)cocoalkyl ammonium chloride, alkyl (C12-16) dimethyl benzyl ammonium chloride, and coco benzyl ammonium chloride ethoxylate. The organic counterion may be introduced by replacing metal counterions, like $Na^+$ or $K^+$.

According to the present invention, the organic counter-ions is incorporated before or during the polymerization of the polymerization mixture, e.g. during the aqueous polymerisation. According to specific embodiments it might be advantageous to incorporate or add the organic counter-ions at the beginning of the polymerization. For example, the organic counter-ions may be added not later than 30 minutes after the starting point of the polymerization, preferably not later than 20 min, more preferably not later than 10 minutes and even more preferred not later than 5 minutes after the starting point of the polymerization. Alternatively, the organic counter-ions may be added before 5%, 10%, 15%, 20%, 25%, 30%, 35% or 50% of the polymerization reaction is performed. Preferably, the organic counter-ions is added before the polymerisation reaction is started. Herein, the starting point of the polymerization might be specified, for example, by the addition of a radical initiator, an acid, a catalyst, heat or irradiation. The incorporation may be performed by simply contacting the acid group with the organic compounds. The acid group is converted into an anionic group neutralized by the organic compound which is converted to an organic counter-ion by protonation.

One additional advantage of the use of the inventive anionic water-soluble polymers refers to the reduction or avoidance of microgel formation. In this context, it is indicated that usually injectivity issues can be observed when high molecular weight (MW>1 million) or even very high molecular weight (MW>18 million) polymers are used in oil field applications. One reason for these problems is in the formation of microgels which decrease the injectivity in the subterranean formation. These microgels can damage the formation since they can plug pores and throats of the rock. Microgels are detrimental to injectivity (increase injection pressure) and can block sweep targeted areas. These areas that still contain oil are no more accessible for further EOR techniques. For a polymer flood, it is therefore of importance to avoid cumulation of microgels in the formation. It was surprisingly found that the anionic water-soluble polymers contemplated for the inventive use or method avoid or reduce this microgel formation and, thus provide improved injectivity. The improved injectivity can be simulated or be proven by the filter ratio (FR). The FR value can thus be used to design especially good or advantageous anionic water-soluble polymers, since it provides information about the injectivity properties, which are inter alia influenced by microgel formation. Especially advantageous water-soluble anionic polymers provide a FR of less than 1.5, less than 1.4, less than 1.3, less than 1.2 or less than 1.1, wherein the FR is measured according to the method described herein.

Wherein an indefinite of definite article is used in conjunction with a singular noun, for example "a", "an", "the", this includes a plural of that noun unless specifically stated otherwise.

The term "comprising" as used herein should not be interpreted as being restricted to the means listed thereafter, it does not exclude other elements or steps.

It has to be understood that one specific embodiment, a combination of multiple embodiments or even a combination of all embodiments described herein may be selected to achieve a specific preferred embodiment, unless it is clear that specific embodiments can not be combined. In this case the person skilled may use any of the mutual exclusive embodiments, wherein each of these especially preferred embodiments may be selected. Furthermore, it is to be understood, that the mere fact that certain measures are recited in mutually different dependant claims does not indicate that a combination of these measures cannot be used to advantage. It is further to be understood that while the present invention has been described in detail with respect to specific embodiments thereof, it should be noted that the above-mentioned embodiments are to be considered illustrative or exemplary and not restrictive; the invention is not limited to the disclosed embodiments. Variations to the disclosed embodiments can be understood and effected by those skilled in the art in practicing the claimed invention, from a study of the disclosure, and the appended claims.

In the following, the invention will be illustrated by several examples, which are not meant to be limiting to the scope and spirit of the present invention.

EXAMPLES

1. Synthesis of Polymer in Powder Form

Water, acrylamide, acrylic acid are mixed together in a beaker in order to have 30% weight in monomer content. Solution is cooled to 5° C. using an ice bath and organic amine is gently added. Temperature is controlled under 15° C. Then soda or ammonia are added to complete neutralization to pH 6.5-8.0. The solution is cooled to 0° C. and transferred to an adiabatic vessel. A temperature probe is introduced in the Dewar in order to record temperature increase during polymerization. The solution is sparged with nitrogen during 30 minutes. The initiators are introduced in the solution. The choice of initiator is adapted to pH of the solution as well as the type of monomers to be polymerized. For the manufacture of the examples referred to in Table 1, sodium persulfate and sodium sulfite are added to initiate the polymerization. After 5 minutes, viscosity increases in the Dewar, nitrogen sparging is stopped. Temperature rises to 90° C. and polymerization is aged during 3 hours. The gel obtained is cut, granulated using a granulator with grids to obtain gel particles with a diameter below 6 mm. These gel particles are dried in an oven at 50° C. overnight. The dry powder obtained is grinded and sieved to obtain a white powder with particle diameters below 1 mm of diameter with less than 15% water content.

2. Synthesis of 30% mol Anionic Inverse Emulsion

A non aqueous continuous phase was prepared comprising 132 g of low odor paraffin oil, 15 g of sorbitan monooleate and 2 g of a polymeric surfactant (Hypermer 2296, Croda).

An aqueous monomer solution (283 g) comprising acrylamide, acrylic acid and deionized water (monomer content is 50 wt.-%) was cooled to 5° C. Organic amine is then gently added to partially neutralize acrylic acid. The pH was adjusted to 6.8 using sodium hydroxide or aqueous ammonia. 300 to 900 ppm/MA sodium formiate was added as transfer agent to limit or adjust the molecular weight (Mw) of the final polymer. To this solution was added 100-250 ppm/MA potassium bromate solution and 800-1500 ppm/MA diethylenetriaminepentaacetate pentasodium as initiator system.

The resulting oil and aqueous solution were combined and homogenized using an Ultra Turax at 8000 rpm to yield uniform water in oil emulsion. The emulsion is then transferred to a three neck flask and is deoxygenated with nitrogen for 30 minutes. Polymerization is initiated by addition of sodium bisulfite solution via a syringe pump. The reaction temperature is allowed to increase to about 55° C. in about 1 hour 30 minutes. The reaction mixture is then treated with excess of ter-butyl hydroperoxide and bisulfite solution to reduce free monomers. The resulting product is a stable and gel free emulsion having interesting characteristics for oil applications.

3. Filter Ratio (FR) Measurement

Filterability is determined through FR test: a solution of polymer at 1000 ppm is filtered through a 5 µm nucleopore membrane under constant pressure of 2 bars. The membrane or filter (Whatman Nuclepor, 47 mm diameter, polycarbonate type, thickness 7 to 22µ is inserted in a Sartorius SM16249 filtration set-up (bottom part). Time versus filtrated volume is checked. FR corresponds to the difference between time at 300 mL minus time at 200 mL, divided by difference between time at 200 mL minus time at 100 mL:

$$FR = \frac{t_{300ml} - t_{200ml}}{t_{200ml} - t_{100ml}}$$

Time accuracy is 0.1 sec.

4. Tests

Tests are performed using a brine with 3% NaCl, 0.3% $CaCl_2$ $2H_2O$ ("hydrated CaCl2 with 2 moles of H2O"). Solutions are diluted to 1000 ppm of polymer in this brine.

For all the following examples: residual acrylamide corresponds to the acrylamide present in the final product measured by HPLC.

FR was measured. Filtration improvement is assessed in 3% NaCl/0.3% CaCl$_2$ 2H$_2$O, for a gain on filter ration above 15%.

TABLE 1

| Entry | Polymer composition in mol % AMD/AA/ATBS/others | Amine | % of acidic functions neutralized with amine | Polymerization process | Residual acrylamide (ppm) | FR | % gain on filter ratio |
|---|---|---|---|---|---|---|---|
| 1 | AMD/AA: 70/30 | None | 0% | powder | 457 | 1.43 | |
| 2 | AMD/AA: 70/30 | Diisopropylamine | 25% | powder | 215 | 1.19 | 17% |
| 3 | AMD/AA: 70/30 | Ammonia | 25% | powder | 223 | 1.44 | −1% |
| 4 | AMD/AA: 70/30 | Diisopropylamine | 50% | powder | 655 | 1.15 | 20% |
| 5 | AMD/AA: 70/30 | Ammonia | 50% | powder | 302 | 1.39 | 3% |
| 6 | AMD/AA: 70/30 | Diisobutyl-amine | 50% | powder | 332 | 1.19 | 17% |
| 7 | AMD/AA: 70/30 | Diethanol-amine | 50% | powder | 142 | 1.14 | 20% |
| 8 | AMD/AA: 70/30 | Triethanol-amine | 30% | powder | 271 | 1.18 | 17% |
| 9 | AMD/AA/NN-DMA: 50/25/25 | None | 0% | powder | 798 | 1.45 | — |
| 10 | AMD/AA/NN-DMA: 50/25/25 | Triethanol-amine | 100% | powder | 506 | 1.11 | 23% |
| 11 | AMD/ATBS: 75/25 | None | 0% | powder | 602 | 1.31 | — |
| 12 | AMD/ATBS: 75/25 | Diethanol-amine | 50% | powder | 435 | 1.09 | 17% |
| 13 | AMD/AA/ATBS 70/25/5 | None | 0% | Emulsion | 298 | 1.45 | — |
| 14 | AMD/AA/ATBS 70/25/5 | isopropylamine | 50% | Emulsion | 222 | 1.12 | 22% |
| 15 | AMD/AA/NVP: 50/25/25 | None | 0% | Powder | 143 | 1.32 | — |
| 16 | AMD/AA/NVP: 50/25/25 | DMAPA | 40% | powder | 381 | 1.11 | 16% |
| 17 | AMD/ATBS/BEM 79.5/20/0.5 | None | 50% | Emulsion | 377 | 2.12 | — |
| 18 | AMD/ATBS/BEM 79.5/20/0.5 | Diethanol-amine | 50% | Emulsion | 432 | 1.45 | 32% |

Others: NVP, DMA, associative monomer
% of acidic functions correspond to the total mol % of acid function in the polymer (AA + ATBS)
AA: acrylic acid
ATBS: acrylamido terbutyl sulfonic acid
NVP: N-vinylpyrrolidone
DMAPA: dimethylaminopropylamine
BEM: polyethoxylated behenyl methacrylate Entries 1, 9, 11, 13, 15 and 17 correspond to polymers that have been neutralized using only sodium hydroxide (blank). Different levels of anionic contents have been tested.

The "gain" or decrease of FR is the difference between FR obtained with polymer neutralized with NaOH with the FR of the same polymer neutralized with amine divided by the FR of the polymer neutralized with NaOH.

% gain=((FR$_{NaOH}$−FR$_{amine}$)/FR$_{NaOH}$)*100

According to the data presented in table 1, the FR is significantly lower when the polymer is partially or totally neutralized by organic amine during synthesis compared to the polymers that are neutralized with sodium counter ion. The gains in FR are more than 10% and can reach 20% and more in some cases.

Examples 13 and 14 show that the same good results are obtained with an inverse emulsion form.

Examples 15 and 16 show that using a diamine to neutralize the acidic monomer improves the filtration for a polymer containing NVP.

Examples 17 and 18 show that addition of an associative monomer (BEM) induces a bad filtration of the final product but if the neutralization is performed with an organic amine, a strong improvement of filtration is obtained.

For all the examples, residual acrylamide in the polymer is above 100 ppm and below 1000 ppm.

The invention claimed is:

1. A method of performing an oil field application comprising using a water-soluble polymer in the oil field application, wherein the water-soluble polymer is anionic, is partially or totally neutralized with at least one organic counter-ion, is obtainable from a polymerization mixture containing at least one non-ionic monomer and at least one anionic monomer, wherein more than 1% of the anionic groups present in the polymer are neutralized with said organic counter-ions, wherein the organic counter-ion is added before or during the polymerization of the polymerization mixture, and wherein at least one organic counter-ion is selected from the group consisting of $^+$NH$_3$(CH$_3$), $^+$NH$_2$(CH$_3$)$_2$, $^+$NH(CH$_3$)$_3$, $^+$NH$_3$(CH$_2$CH$_3$), $^+$NH$_2$(CH$_2$CH$_3$)$_2$, $^+$NH(CH$_2$CH$_3$)$_3$, $^+$NH$_3$(CH$_2$CH$_2$OH), $^+$NH$_2$(CH$_2$CH$_2$OH)$_2$, $^+$NH(CH$_2$CH$_2$OH)$_3$, methylbis(polyoxyethylene (15)) octadecyl quaternary ammonium, cations derived from N,N-Diethanolamine, N,N,N-triethanolamine, N-ethanolamine, N,N-diisopropylamine, N,N-diethylamine, N,N-dipropylamine, N,N-dimethylaminopropylamine (DMAPA), N-propylamine, N-isopropylamine, N-isobutylamine, N,N-di-isobutylamine, N,N-dibutylamine and N-butylamine.

2. The method according to claim 1, wherein at least one organic counter-ion is selected from organic amines in the protonated form with the general formula $^+$NHR$_1$, R$_2$, R$_3$, wherein R$_1$ and R$_2$ independently from each other are selected from the group consisting of H, substituted or unsubstituted C1-C10alkyl, substituted or unsubstituted C3-C8cycloalkyl, substituted or unsubstituted C6-C14aryl, substituted or unsubstituted heteroaryl and polyoxyethylene-moieties, and R$_3$ is selected from the group consisting of substituted or unsubstituted C1-C10alkyl, substituted or unsubstituted C3-C8cycloalkyl, substituted or unsubstituted C6-C14aryl, substituted or unsubstituted heteroaryl and polyoxyethylene-moieties.

3. The method according to claim 1, wherein the at least one non-ionic monomer is a water-soluble vinylmonomer, preferably selected from the group consisting of acrylamide and methacrylamide, N-isopropyacrylamide, N,N-dimethylacrylamide, diacetone acrylamide, N-vinylformamide, N-vinyl acetamide, N-vinylpyridine, N-vinyl caprolactone and N-vinylpyrrolidone.

4. The method according to claim 1, wherein the at least one anionic monomer is selected from the group consisting of acrylic acid, methacrylic acid, itaconic acid, crotonic acid, maleic acid, fumaric acid, vinylsulfonic acid, vinylphosphonic acid, (meth)allylsulfonic acid, (meth)allylphosphonic acid, acrylamido methyl butanoic acid, acrylamido tertiary butyl sulfonic acid and water-soluble salts of the foregoing substances.

5. The method according to claim 1, wherein the polymerization mixture contains at least one cationic monomer, preferably a cationic monomer being derived from a non ionic monomer being protonated, more preferably a cationic monomer being derived from a non ionic monomer having a tertiary amine function including dimethylaminoethyl acrylate (DMAEA), dimethylaminoethyl methacrylate (DMAEMA), dimethylaminopropyl acrylate (DMAPA) and dimethylaminopropyl methacrylate (DMAPMA).

6. The method according to claim 1, wherein the anionic water-soluble polymer is hydrophobically modified.

7. The method according to claim 1, wherein the polymerization mixture contains at least one branching agent, preferably at least one branching agent selected from the group consisting of methylene bisacrylamide (MBA), ethylene glycol diacrylate, polyethylene glycol dimethacrylate, vinyloxyethylacrylate or methacrylate, triallylamine, pentaerythritol triallyl ether, glycidylethers including diglycidylether, and epoxides.

8. The method according to claim 1, wherein the water-soluble anionic polymer in aqueous solution provides a filter ratio of not more than 1.5.

9. The method according to claim 1, wherein the anionicity of the water-soluble anionic polymer is less than 70 mol-%.

10. The method according to claim 1, wherein the weight average molecular weight of the water-soluble anionic polymer is more than 1 million and less than 20 million.

11. The method according to claim 1, wherein the oil field application is enhanced oil recovery, drilling, drag reduction, hydraulic fracturing, water shut-off and conformance control or mining.

12. The method according to claim 1, wherein the oil field application is a method for treating a subterranean formation.

13. The method according to claim 1, wherein the water-soluble anionic polymer in aqueous solution provides a filter ratio of not more than 1.3.

14. The method according to claim 1, wherein the water-soluble anionic polymer in aqueous solution provides a filter ratio of not more than 1.1.

* * * * *